US009243626B2

(12) United States Patent
Estelle

(10) Patent No.: US 9,243,626 B2
(45) Date of Patent: Jan. 26, 2016

(54) ADHESIVE DISPENSING SYSTEM AND METHOD INCLUDING A PUMP WITH INTEGRATED DIAGNOSTICS

(71) Applicant: Nordson Corporation, Westlake, OH (US)

(72) Inventor: Peter W. Estelle, Norcross, GA (US)

(73) Assignee: NORDSON CORPORATION, Westlake, OH (US)

( * ) Notice: Subject to any disclaimer, the term of this patent is extended or adjusted under 35 U.S.C. 154(b) by 112 days.

(21) Appl. No.: 13/799,656

(22) Filed: Mar. 13, 2013

(65) Prior Publication Data

US 2014/0138399 A1 May 22, 2014

Related U.S. Application Data

(60) Provisional application No. 61/727,924, filed on Nov. 19, 2012.

(51) Int. Cl.
*B67B 7/00* (2006.01)
*G01F 11/00* (2006.01)
(Continued)

(52) U.S. Cl.
CPC ............... *F04B 49/00* (2013.01); *B05C 5/0225* (2013.01); *B05C 11/1002* (2013.01); *F04B 9/125* (2013.01); *F04B 49/065* (2013.01);
(Continued)

(58) Field of Classification Search
CPC ............ F04B 49/00; F04B 2201/0201; F04B 2201/0207; F04B 2201/02071; F04B 2201/0208; F04B 2203/0903; F04B 9/125; F04B 49/065; B05C 5/0225; B05C 11/1002; B05B 12/00
USPC .......... 222/1, 28, 30, 334, 340; 417/63, 9, 15, 417/20, 22, 46
See application file for complete search history.

(56) References Cited

U.S. PATENT DOCUMENTS

| | | | |
|---|---|---|---|
| 2,672,215 | A | 3/1954 | Schmid |
| 2,744,792 | A | 5/1956 | Finn |

(Continued)

FOREIGN PATENT DOCUMENTS

| | | | |
|---|---|---|---|
| CN | 202116049 | U | 1/2012 |
| DE | 3815089 | A1 | 11/1989 |

(Continued)

OTHER PUBLICATIONS

Crowder, Richard. (2006). Electric Drives and Electromechanical Systems. (pp. 119,120). Elsevier.*

(Continued)

*Primary Examiner* — Paul R Durand
*Assistant Examiner* — Benjamin R Shaw
(74) *Attorney, Agent, or Firm* — Baker & Hostetler LLP

(57) ABSTRACT

An adhesive dispensing system includes a pump and at least one sensor positioned to sense movements of a component of the pump and produce signals based on the sensed movements. The dispensing system also includes a controller operating the pump and communicating with the at least one sensor to collect information regarding operational cycles of the pump based on the signals. As a result, one or more diagnostic processes are enabled at the controller during operation of the adhesive dispensing system. These diagnostic processes may include a leak rate test for the dispensing system, an overspeed detection test for the pump, and expected life cycle monitoring of the pump or other components.

26 Claims, 8 Drawing Sheets

(51) Int. Cl.

| | |
|---|---|
| ***F04B 49/00*** | (2006.01) |
| ***B05C 11/10*** | (2006.01) |
| ***B05C 5/02*** | (2006.01) |
| ***F04B 9/125*** | (2006.01) |
| ***F04B 49/06*** | (2006.01) |
| *B05B 12/00* | (2006.01) |

(52) U.S. Cl.

CPC ........ *B05B 12/00* (2013.01); *F04B 2201/0207* (2013.01); *F04B 2201/02071* (2013.01)

(56) References Cited

U.S. PATENT DOCUMENTS

| | | | | |
|---|---|---|---|---|
| 2,824,335 | A | 2/1958 | Moffatt | |
| 2,868,015 | A | 1/1959 | Haropulos | |
| 3,030,153 | A | 4/1962 | Krenke et al. | |
| 3,219,394 | A | 11/1965 | Moss | |
| 3,377,861 | A | 4/1968 | Sherwood et al. | |
| 3,580,644 | A | 5/1971 | Ballard | |
| 3,756,456 | A * | 9/1973 | Georgi | 222/1 |
| 3,773,069 | A | 11/1973 | Rebentisch | |
| 3,981,416 | A | 9/1976 | Scholl | |
| 4,084,628 | A | 4/1978 | Schmid | |
| 4,086,466 | A | 4/1978 | Scharlack | |
| 4,277,773 | A | 7/1981 | Blatnik | |
| 4,417,675 | A | 11/1983 | Abt et al. | |
| 4,437,581 | A | 3/1984 | Coker | |
| 4,441,450 | A | 4/1984 | Dettelbach et al. | |
| 4,474,311 | A | 10/1984 | Petrecca | |
| 4,479,600 | A | 10/1984 | Albright | |
| 4,482,367 | A | 11/1984 | Howeth | |
| 4,583,885 | A | 4/1986 | Thiele | |
| 4,613,059 | A | 9/1986 | Merkel | |
| 4,688,432 | A | 8/1987 | Marsh | |
| 4,821,922 | A | 4/1989 | Miller et al. | |
| 4,850,425 | A | 7/1989 | Anderson | |
| 4,898,527 | A | 2/1990 | Claassen | |
| 4,994,984 | A * | 2/1991 | Massimo | 702/46 |
| 5,006,018 | A | 4/1991 | Depew | |
| 5,174,472 | A * | 12/1992 | Raque et al. | 222/1 |
| 5,287,086 | A | 2/1994 | Gibb | |
| 5,294,218 | A | 3/1994 | Fiorentini et al. | |
| 5,332,366 | A * | 7/1994 | Anderson | 417/63 |
| 5,347,867 | A | 9/1994 | Pangerl | |
| 5,589,203 | A | 12/1996 | Sato | |
| 5,680,961 | A | 10/1997 | Boccagno et al. | |
| 5,715,972 | A | 2/1998 | Siddiqui | |
| 5,747,689 | A | 5/1998 | Hampo et al. | |
| 5,791,830 | A | 8/1998 | Fort et al. | |
| 5,909,829 | A | 6/1999 | Wegman et al. | |
| 6,039,513 | A | 3/2000 | Law | |
| 6,073,488 | A | 6/2000 | Byatt et al. | |
| 6,095,803 | A | 8/2000 | Slater | |
| 6,175,101 | B1 | 1/2001 | Miller et al. | |
| 6,230,936 | B1 | 5/2001 | Lasko | |
| 6,318,599 | B2 | 11/2001 | Estelle et al. | |
| 6,352,173 | B1 | 3/2002 | Duckworth | |
| 6,380,861 | B2 | 4/2002 | Estelle et al. | |
| 6,471,751 | B1 | 10/2002 | Semanderes et al. | |
| 6,616,721 | B2 | 9/2003 | Oh | |
| 7,263,781 | B2 * | 9/2007 | Sielemann | 33/708 |
| 7,626,143 | B2 | 12/2009 | Miller | |
| 8,157,483 | B2 | 4/2012 | Volkmann | |
| 8,201,717 | B2 | 6/2012 | Varga et al. | |
| 8,383,991 | B2 | 2/2013 | Ganzer et al. | |
| 8,430,230 | B1 | 4/2013 | Ferguson et al. | |
| 8,580,006 | B2 | 11/2013 | LaCroix et al. | |
| 2001/0023880 | A1 | 9/2001 | Estelle et al. | |
| 2002/0079325 | A1 | 6/2002 | Estelle | |
| 2003/0021700 | A1 * | 1/2003 | Serafin et al. | 417/226 |
| 2003/0080154 | A1 | 5/2003 | Jeter | |
| 2003/0080156 | A1 * | 5/2003 | Jeter et al. | 222/146.5 |
| 2004/0055739 | A1 | 3/2004 | Suckow et al. | |
| 2004/0167738 | A1 * | 8/2004 | Miller | 702/114 |
| 2005/0274740 | A1 | 12/2005 | Duckworth et al. | |
| 2006/0055503 | A1 | 3/2006 | Tanida | |
| 2006/0159565 | A1 * | 7/2006 | Sanwald | 417/395 |
| 2006/0289560 | A1 | 12/2006 | Bourget et al. | |
| 2007/0080157 | A1 | 4/2007 | Mehaffy et al. | |
| 2007/0216424 | A1 | 9/2007 | Sieh et al. | |
| 2008/0095637 | A1 | 4/2008 | Burdi et al. | |
| 2008/0120046 | A1 | 5/2008 | Tung et al. | |
| 2008/0145248 | A1 * | 6/2008 | Kato et al. | 417/464 |
| 2008/0156801 | A1 | 7/2008 | Tung et al. | |
| 2008/0196512 | A1 * | 8/2008 | Miller | 73/862.581 |
| 2008/0199323 | A1 * | 8/2008 | Bauck et al. | 417/63 |
| 2008/0206066 | A1 * | 8/2008 | Nguyen et al. | 417/46 |
| 2008/0282795 | A1 | 11/2008 | Zabel et al. | |
| 2008/0302477 | A1 | 12/2008 | Varga et al. | |
| 2009/0229359 | A1 | 9/2009 | Reimelt et al. | |
| 2009/0229683 | A1 | 9/2009 | Baek et al. | |
| 2009/0285983 | A1 | 11/2009 | Baldauf et al. | |
| 2010/0282088 | A1 | 11/2010 | Deuber et al. | |
| 2011/0000309 | A1 | 1/2011 | Griffiths et al. | |
| 2011/0002793 | A1 * | 1/2011 | Bauck et al. | 417/46 |
| 2011/0042408 | A1 | 2/2011 | Giordano et al. | |
| 2011/0079078 | A1 | 4/2011 | Ho et al. | |
| 2011/0100120 | A1 | 5/2011 | Neuburger et al. | |
| 2012/0051945 | A1 * | 3/2012 | Orndorff et al. | 417/53 |
| 2012/0223094 | A1 | 9/2012 | Rickard, Jr. et al. | |
| 2012/0227484 | A1 | 9/2012 | Chen et al. | |
| 2012/0247665 | A1 | 10/2012 | Varga et al. | |
| 2012/0273071 | A1 * | 11/2012 | Kai | 137/565.17 |
| 2013/0105003 | A1 | 5/2013 | Quam et al. | |
| 2013/0105004 | A1 | 5/2013 | Tix et al. | |
| 2013/0105005 | A1 | 5/2013 | Tix et al. | |
| 2013/0105039 | A1 | 5/2013 | Tix et al. | |
| 2013/0105517 | A1 | 5/2013 | Tix et al. | |
| 2013/0105526 | A1 | 5/2013 | Ross et al. | |
| 2013/0112279 | A1 | 5/2013 | Ross et al. | |
| 2013/0112280 | A1 | 5/2013 | Quam et al. | |
| 2013/0112294 | A1 | 5/2013 | Ross et al. | |
| 2013/0112312 | A1 | 5/2013 | Ross et al. | |
| 2013/0112709 | A1 | 5/2013 | Ross et al. | |
| 2013/0112710 | A1 | 5/2013 | Ross et al. | |
| 2013/0112711 | A1 | 5/2013 | Lind et al. | |
| 2013/0115016 | A1 | 5/2013 | Ross et al. | |
| 2013/0205893 | A1 | 8/2013 | Shearer et al. | |
| 2014/0020463 | A1 | 1/2014 | Ikeya et al. | |

FOREIGN PATENT DOCUMENTS

| | | | |
|---|---|---|---|
| DE | 19923410 | A1 | 11/1999 |
| DE | 10156691 | A1 | 5/2003 |
| EP | 0072679 | A1 | 2/1983 |
| EP | 1350743 | B1 | 6/2006 |
| EP | 2119509 | A2 | 11/2009 |
| FR | 1366936 | A | 7/1964 |
| FR | 2787770 | A1 | 6/2000 |
| GB | 1562562 | A | 3/1980 |
| GB | 2485041 | A | 5/2012 |
| WO | 9814314 | A1 | 4/1998 |
| WO | 2007084891 | A2 | 7/2007 |
| WO | 2009046545 | A1 | 4/2009 |
| WO | 2012095838 | A1 | 7/2012 |

OTHER PUBLICATIONS

European Patent Office, European Search Report in corresponding European Patent Application No. 13184144.7 dated Mar. 25, 2014 (6 pages).

Fluid-Air Products Inc., InvisiPac, Jan. 5, 2013.

Meltex Corporation; Product Information Sheet; Hot Melt Applicator MP 400; 1 page.

MELTEX GmbH; Product Information Sheet; Hot Melt Applicator MX 2001; 2 pages.

MELTEX GmbH; Product Information Sheet; Hot Melt Applicator MX 2003; 2 pages.

(56) References Cited

OTHER PUBLICATIONS

European Patent Office, Extended European Search Report in EP Patent Application No. 13185184, Jun. 6, 2014 (7 pages).
United States Patent and Trademark Office, Non-Final Office Action issued in corresponding U.S. Appl. No. 13/799,788 (Jun. 12, 2014) (24 pages).
European Patent Office, Extended European Search Report in corresponding European Patent Application No. 13187639.3, dated Feb. 28, 2014 (5 pages).

European Patent Office, Extended European Search Report in EP Patent Application No. 13185893.8, Apr. 1, 2015 (6 pages).

* cited by examiner

ADHESIVE DISPENSING SYSTEM AND METHOD INCLUDING A PUMP WITH INTEGRATED DIAGNOSTICS

CROSS-REFERENCE TO RELATED APPLICATION

This application claims the benefit of U.S. Provisional Patent Application Ser. No. 61/727,924, filed on Nov. 19,2012, the disclosure of which is incorporated by reference herein in its entirety.

FIELD OF THE INVENTION

The present invention generally relates to an adhesive dispensing system and more particularly, adhesive dispensing systems and methods using a piston pump to move adhesive toward an outlet.

BACKGROUND

A conventional dispensing system for supplying heated adhesive (i.e., a hot-melt adhesive dispensing system) generally includes an inlet for receiving adhesive materials in solid or semi-solid form, a melter in communication with the inlet for heating and/or melting the adhesive materials, an outlet in communication with the melter for receiving the heated adhesive from the melter, and a pump in communication with the melter and the outlet for driving and controlling the dispensation of the heated adhesive through the outlet. One or more hoses or manifolds may also be connected to the outlet to direct the dispensation of heated adhesive to adhesive dispensing guns or modules located downstream from the pump. Furthermore, conventional dispensing systems generally include a controller (e.g., a processor and a memory) and input controls electrically connected to the controller to provide a user interface with the dispensing system. The controller is in communication with the pump, melter, and/or other components of the dispensing system, such that the controller controls the dispensation of the heated adhesive.

One conventional type of hot-melt adhesive dispensing system may include a piston pump that operates by reciprocating a pump rod through forward and backward strokes in a hydraulic passage. For example, the pump rod may cause drawing of adhesive from a pump inlet into the hydraulic passage during a backward stroke and then force that adhesive from the hydraulic passage through a pump outlet during a forward stroke of the pump rod. The pump rod may also operate to push adhesive through the hydraulic passage during both the forward and backward strokes in some embodiments. The pump rod is connected to a piston in a piston chamber separated from the hydraulic passage, and the piston is driven in opposing directions by pressurized air delivered by solenoids into the piston chamber. As a result of the pump being driven at various speeds as well as continuously and intermittently, the pump must also include a shifter that reverses the movement direction of the piston and the pump rod when the pump rod reaches an end condition.

One particular type of shifter is a mechanical shifter that includes a magnet that moves with a portion of the pump rod. Corresponding switch magnets can be positioned adjacent the end conditions such that when the piston and pump rod arrive at an end condition, the magnet on the pump rod attracts or repels the switch magnet at that end condition to mechanically switch the solenoids to an opposite operating state. To this end, if a first solenoid supplying pressurized air to an upper side of the piston were active and a second solenoid supplying pressurized air to a lower side of the piston were inactive, the resulting movement of the switch magnet at the end condition would cause the first solenoid to be inactive and the second solenoid to be active. Consequently, the piston and pump rod would begin to move in the opposite direction towards the other end condition (at which point, the other switch magnet would mechanically switch the solenoids back to the original operating state). In similar embodiments, the solenoids may be replaced by an air shifting valve supplied with pressurized air, the air shifting valve being moved by the switch magnet to different positions to supply the pressurized air selectively to the upper and lower sides of the piston. The mechanical shifter is highly reliable in operation, but the various components and magnets must be carefully aligned within the pump to ensure proper operation of the pump.

Furthermore, pumps can develop various conditions such as leaking seals or inoperative valves that interfere with the pumping operation. Conventional piston pumps typically do not include sensors or monitoring devices that can detect these conditions, and therefore, the pumps must usually be damaged or significantly degraded before there is any indication that something is wrong with the pumps. To this end, the pumps are generally operated blindly with respect to these various conditions. Although diagnostics are conducted at the end of a manufacturing line for these pumps, the conventional pumps are inoperable to perform similar diagnostics when operating in the field. As a result, repairs of the pump can be time-consuming and costly (specifically, in lost production time or downtime caused by the repairs) when one of these various conditions occurs and interferes with the pumping operation.

For reasons such as these, an improved adhesive dispensing system and method, including the use of a pump with integrated diagnostics for use during regular operation, would be desirable.

SUMMARY OF THE INVENTION

According to one embodiment of the invention, a method of operating an adhesive dispensing system having a pump is provided. The method includes operating the pump by moving a pump component to move liquid adhesive from a source of liquid adhesive to device pump outlet. Movements of the pump component are monitored with at least one sensor, and the at least one sensor produces signals based on the monitored movements of the pump component. The controller collects information regarding operational cycles of the pump based on the signals. As a result, the adhesive dispensing system automatically collects information about pump operation that may be used to enable one or more diagnostic processes during dispensing operation.

In one aspect of the invention, the method also includes performing at least one diagnostic process with the controller pertaining to the pump or to the adhesive dispensing system as a whole based on the collected information. To this end, performing the diagnostic process may include monitoring a total number of operational cycles performed by the pump and providing an indication that the pump will require maintenance or replacement after the pump has reached the total number of operational cycles corresponding to a predetermined percentage of predicted total life. The flow rate of liquid adhesive being dispensed from the dispenser device may be approximated by monitoring the speed of the operational cycles performed by the pump. In another example, performing the diagnostic process may include determining if the speed of operational cycles performed by the pump exceeds a predetermined threshold indicating an overspeed condition, which may be caused by a number of error states or fault conditions, including running out of adhesive or a burst hose. When an overspeed condition is detected, the method includes reducing the speed of movements of the pump component in response to the detected overspeed condition to avoid added damage caused by operation at overspeed.

In yet another example, performing the diagnostic process may include a leak rate test, which is performed by closing device valve downstream from the pump outlet, continuing to operate the pump, and measuring the speed of operational cycles of the pump to provide an indication of an approximate leak rate at the pump based on the speed of operational cycles. This diagnostic may be run periodically during operation, such as at the beginning of each working day, to continually monitor the reliability of seals used with the adhesive dispensing system. In one particular example, the adhesive dispensing system may also include a dispenser device such as a module with a dispensing valve controlling flow from the pump. In such embodiments, the leak rate test is run by closing all dispensing valves and then operating the pump, which should result in no movement of the pump if no leaks are present at the pump.

Generally speaking, the diagnostic processes are configured to identify error states or fault conditions based on the collected information, and then provide an indication to an operator of the error state or fault condition. For example, providing the indication may include producing a message on a display screen or illuminating an indicator light or tone that indicates an error state or fault condition has been identified. These error states and fault conditions may be detected without directly measuring pressure within the pump with a pressure transducer, so the additional diagnostic capabilities are provided with minimal additional expense and maintenance requirements.

In another aspect, the pump is a piston pump with a piston coupled to a pump rod. Operating the pump is performed by actuating at least one solenoid to supply pressurized air to one side of the piston, thereby moving the piston and the pump rod from a first end condition to a second end condition. The operating state of the solenoid(s) is switched so that the pressurized air is supplied to the other side of the piston to move the piston and pump rod back to the first end condition. It will be understood that the solenoid(s) could be replaced by a spool valve or some other air valve in other embodiments. The pump rod moves liquid adhesive during the movement between the first and second end conditions, thereby pumping liquid adhesive to the dispenser device. In this embodiment, the movements of the pump component may be monitored by detecting when the piston and the pump rod approach the first and second end conditions with the at least one sensor. For example, the sensor may include a Hall Effect sensor that detects the passing of at least one magnet mounted on either the piston or the pump rod and proximate to the sensor. In another example, the sensor may include an LVDT sensor in the form of a coil that detects the current location of the piston and the pump rod by sensing the location of a magnetic piece moving with the piston or the pump rod along the LVDT sensor. The sensor may include other alternative types of sensors as well, including but not limited to: capacitive sensors, contact sensors such as those with microswitches, and intermediate sensors such as a rack-like element that provides indications of partial stroke movements of the pump rod. In this regard, the sensor may include any kind of point sensor that detects when the piston and pump rod reach a certain location during movement or continuous/incremental movement sensor that detects movement over a range of the piston and pump rod movement. The switching of operating states for the solenoid(s) and the sensing of pump movements to enable diagnostics can all be performed by the same sensor, which simplifies the components needed for this invention.

According to another embodiment of the invention, an adhesive dispensing system includes a dispenser device for dispensing liquid adhesive and a pump coupled to the dispenser device. The pump is configured to move a pump component to move liquid adhesive from a source of liquid adhesive to the dispenser device. The adhesive dispensing system also includes at least one sensor positioned to sense movements of the pump component and to produce signals based on the sensed movements of the pump component. The dispensing system further includes a controller communicating with the at least one sensor. The controller operates the pump and collects information regarding operational cycles of the pump based on the signals. Therefore, the controller is enabled to perform one or more diagnostic processes pertaining to the pump and to the adhesive dispensing system as a whole based on the collected information. The diagnostic processes may pertain to expected life of the pump, overspeed conditions at the pump, and leak rates in the adhesive dispensing system. The pump may be a piston pump with solenoids for delivering pressurized air to move a piston and a pump rod, and the switching device used to switch the operating state of the solenoids may provide the sensors needed to monitor pump component movements and enable the diagnostic processes.

In another embodiment, a pump includes a pump component that moves in a repeatable manner and is configured to actuate movement of liquid adhesive within an adhesive dispensing system. The pump includes a controller that controls operation of the pump component. At least one sensor is positioned to sense movements of the pump component and produce signals based on the sensed movements. This sensor communicates with the controller such that the controller collect information regarding operational cycles of the pump based on the signals. As a result, the controller of the pump is operable to perform multiple diagnostic processes related to the pump.

In yet another embodiment according to the current invention, an adhesive dispensing system includes a pump having a pump component that moves to move a liquid adhesive. At least one sensor is positioned to sense movements of the pump component and then produce signals based on the sensed movements. The system further includes a diagnostic device with a controller communicating with the sensor. The controller of the diagnostic device collects information regarding operational cycles of the pump based on the signals. The controller is configured to perform at least one diagnostic process based on the collected information. For example, the diagnostic process may include an overspeed detection process.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Figure 1:
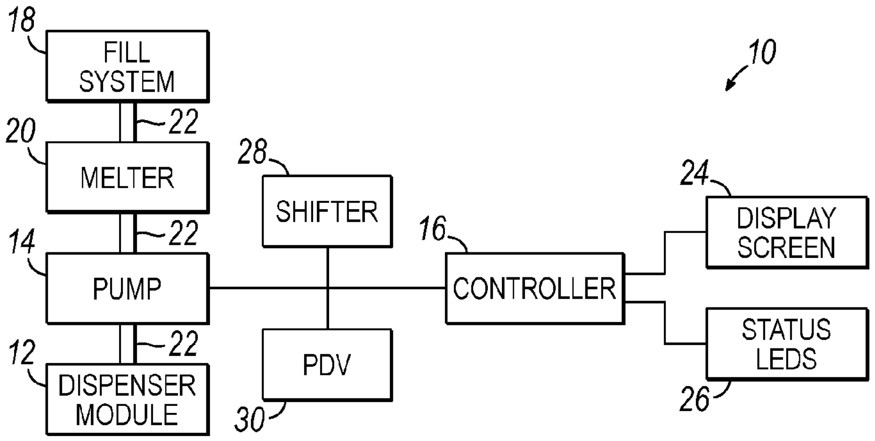
FIG. 1 is a schematic view of an adhesive dispensing system including a pump and controller configured to perform diagnostics during regular operation according to one embodiment of the current invention.

Referring to FIG. 1, an adhesive dispensing system 10 in accordance with one embodiment of the invention is shown. The adhesive dispensing system 10 is configured to deliver liquid adhesive from a source of liquid adhesive to a dispenser module 12 using a pump 14, such that the liquid adhesive may be dispensed on demand at the dispenser module 12. Advantageously, the controller 16 that operates the pump 14 is configured to collect information regarding the operational cycles performed by the pump 14. This information is based on sensed movements of the pump 14 and may be used to perform one or more diagnostics pertaining to the pump 14 or to the adhesive dispensing system 10 as a whole. These diagnostic processes may be used to detect error states and fault conditions of the pump 14 such as high leak rates and overspeed conditions, thereby enabling maintenance to be performed before these error states cause significant component damage or adhesive loss. Furthermore, the sensors used to detect the pump movements may also be used for other control purposes, thereby reducing the added cost and manufacturing required to enable these diagnostic processes. As a result, the adhesive dispensing system 10 automatically enables these diagnostic processes that provide more information to an end user of the adhesive dispensing system 10 during actual operation of the dispensing system 10.

With continued reference to FIG. 1, the components of this embodiment of the adhesive dispensing system 10 are shown schematically. More specifically, the source of liquid adhesive is shown as a fill system 18 connected to a melter 20, which heats adhesive materials supplied by the fill system 18 into a molten or liquid adhesive at an application temperature. This liquid adhesive is supplied from the melter 20 to the pump 14, and the pump 14 moves this liquid adhesive to the dispenser module 12 for dispensing, as described briefly above. The fill system 18 and the melter 20 may include any known equipment for supplying and melting adhesive material, such as the melters commercially available from Nordson Corporation of Westlake, Ohio. It will also be understood that the dispenser module 12 could be replaced with any known type of dispensing device 12 in other embodiments of the current invention. For example, the specific components and operation of the adhesive dispensing system 10 of this embodiment are described in further detail in co-pending U.S. patent application Ser. No. 13/799,622 to Clark et al., entitled "Adhesive Dispensing Device Having Optimized Reservoir and Capacitive Level Sensor", the disclosure of which is hereby incorporated by reference herein in its entirety. However, it will be understood that the pump 14 and diagnostic and control methods described below may also be used with any type of dispensing device or with just the pump 14 by itself (e.g., no dispenser module 12) so as to feed a downstream outlet or mechanism of varying types via an outlet hose.

Each of these components is shown connected with a hose 22 in FIG. 1, although it will be understood that one or more of these components may be connected into fluid communication directly and without the use of hoses 22 in some embodiments. The controller 16 that operates the pump 14 may also be connected to the fill system 18, the melter 20, and/or the dispenser module 12. To this end, the controller 16 may monitor and control the operation of each of the components in the adhesive dispensing system 10, in embodiments where such a centralized control is desirable. Alternatively, the controller 16 may simply be the onboard controller for the pump. Regardless of how many components the controller 16 is connected to, the adhesive dispensing system 10 may also include a display screen 24 and status indicator lights 26 operatively coupled to the controller 16. The display screen 24 and the indicator lights 26, which may be light-emitting diodes (LEDs) located at the controller 16 itself or at a remote location on or away from the pump 14, may be actuated to provide warnings or messages generated by the controller 16 as a result of the collection of information about the pump 14 and the dispensing system 10 at the controller 16. It will be understood that the indicator lights 26 may include or be replaced with a sound indicator such as a speaker configured to provide an indicator tone corresponding to a warning or message generated by the controller 16 in other embodiments.

The controller 16 includes a processor and memory (not shown in FIG. 1) with program code resident in the memory that is configured to be executed by the processor to perform a series of operations for using the adhesive dispensing system 10 and performing integrated diagnostics. To this end, the controller 16 operates the pump 14 to move liquid adhesive from the melter 20 to the dispenser module 12. The controller 16 receives monitored pump movements from at least one sensor (not shown in FIG. 1) and collects information regarding the operational cycles of the pump 14 based on the monitored pump movements. The controller 16 may also actuate dispensing of the liquid adhesive at the dispenser module 12. As a result of collecting the information from the monitored pump movements, the controller 16 may also perform at least one diagnostic process pertaining to the pump 14 or to the adhesive dispensing system 10 as a whole. The diagnostic processes may identify error states that will require operator attention or maintenance, and the controller 16 may provide an indication such as generating a message at the display screen 24 and/or illuminating the indicator lights 26 of such an error state. In addition, the controller 16 may also be configured to modify the operation of the pump 14 in certain circumstances, such as slowing down or stopping the pump 14 when overspeed is detected. Accordingly, the adhesive dispensing system 10 and the pump 14 have integrated diagnostics that may provide more information to an end user or operator during actual operation of these components.

In order to better describe how the diagnostic processes are automatically enabled by the adhesive dispensing system 10, a more detailed description of the first embodiment of the dispensing system 10 and its components is provided below. As described in further detail below, the pump 14 of this embodiment may include a piston pump 14 similar to the SP Pump commercially available from Nordson Corporation of Westlake, Ohio. As well understood in the dispensing field, the piston pump 14 moves liquid adhesive with reciprocating movement of a piston and a pump rod (components not shown in FIG. 1) actuated by pressurized air. The piston pump 14 includes a shifter 28 that mechanically or electrically changes the operating state of solenoids (not shown in FIG. 1), which control flow of pressurized air into the pump 14. This shifter 28 may be coupled to the controller 16 as shown in FIG. 1. The piston pump 14 also includes additional components such as a pressure dump valve ("PDV") 30 that assists with operation of the pump 14. For example, the PDV 30 operates to ensure that hydraulic pressure and flow are actually generated by reciprocating the piston and the pump rod. In addition, the PDV 30 operates to dump excess pressure from the pump when necessary for safety purposes. The PDV 30 may also be connected to the controller 16 such that the controller 16 operates all of the components of the pump 14. It will be appreciated that other embodiments of the invention may include adhesive dispensing systems 10 with different types of pumps for moving liquid adhesive, including but not limited to gear pumps, without departing from the scope of the current invention. In this regard, the monitoring and diagnostics enabled by the current invention may be used regardless of the type of pump 14 used with the adhesive dispensing system 10.

Figure 2:
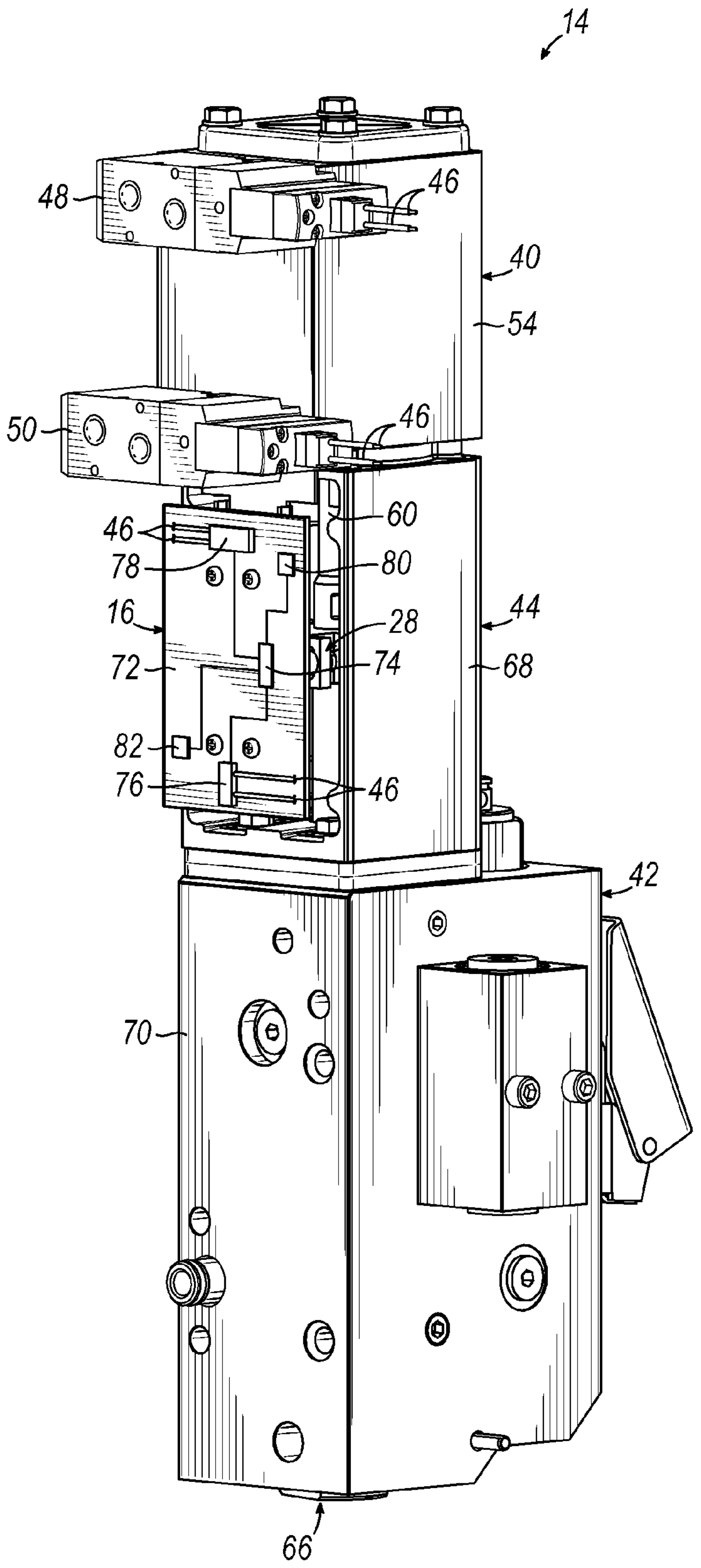
FIG. 2 is a rear perspective view of the pump and controller of FIG. 1.
Figure 3:
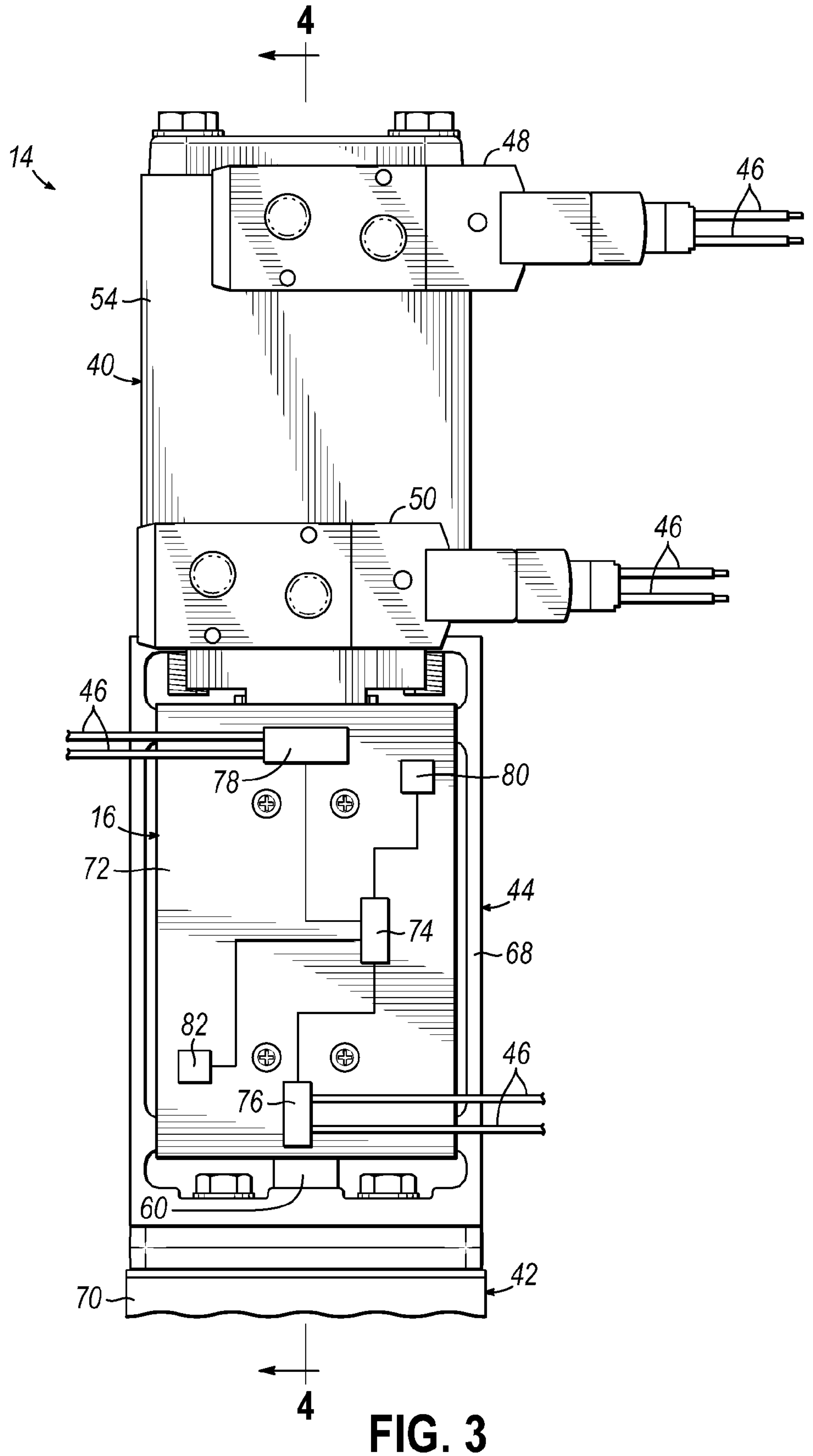
FIG. 3 is a rear elevational view of the pump and controller of the adhesive dispensing system of FIG. 2, showing further details of the controller.
Figure 4:
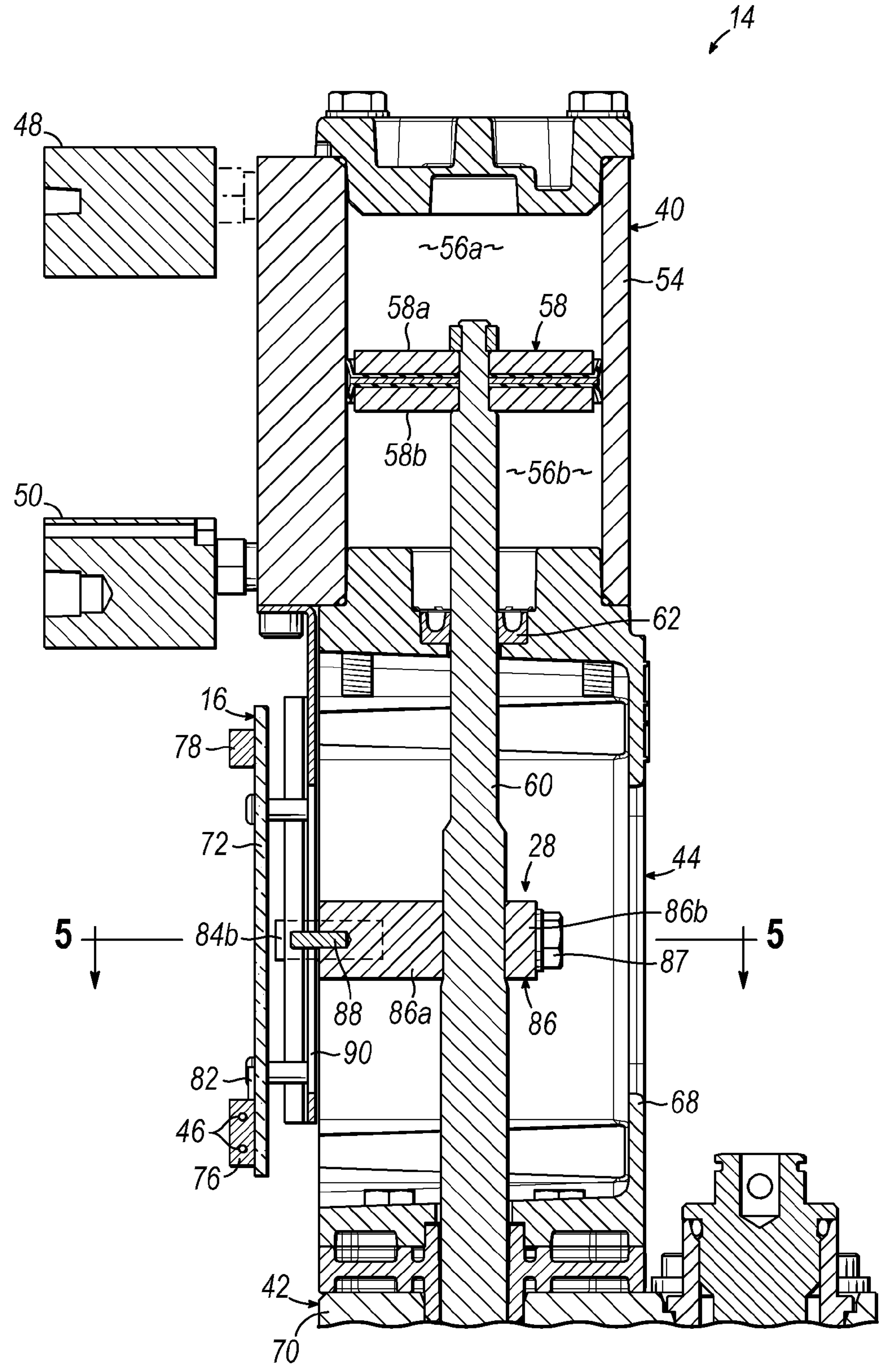
FIG. 4 is a cross-sectional side view of the pump and controller of FIG. 3, showing a piston of the pump in a central position.
Figure 5:
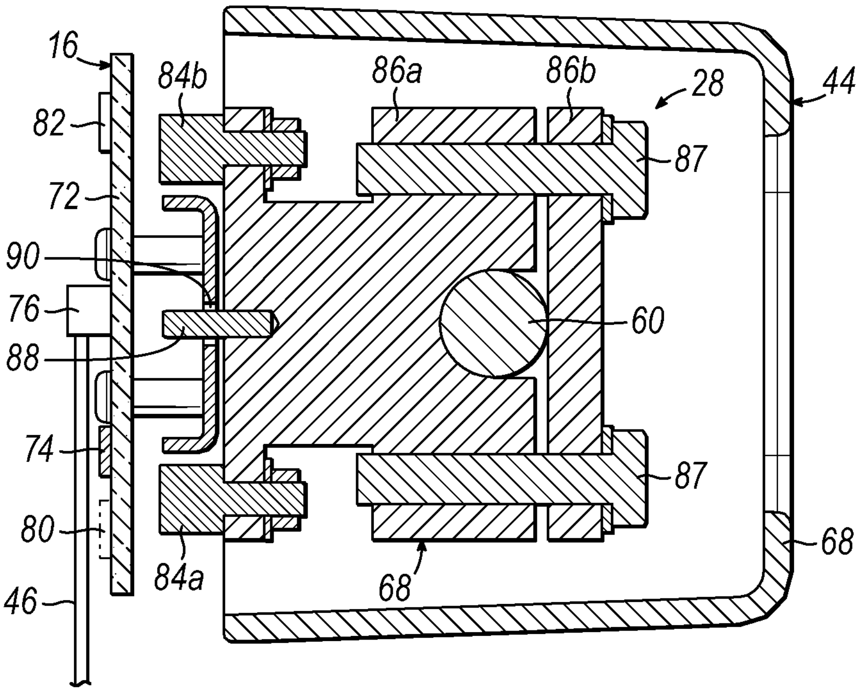
FIG. 5 is a cross-sectional top view of the pump and controller of FIG. 4, thereby illustrating additional details of an electric shifter used with the pump.
Figure 6:
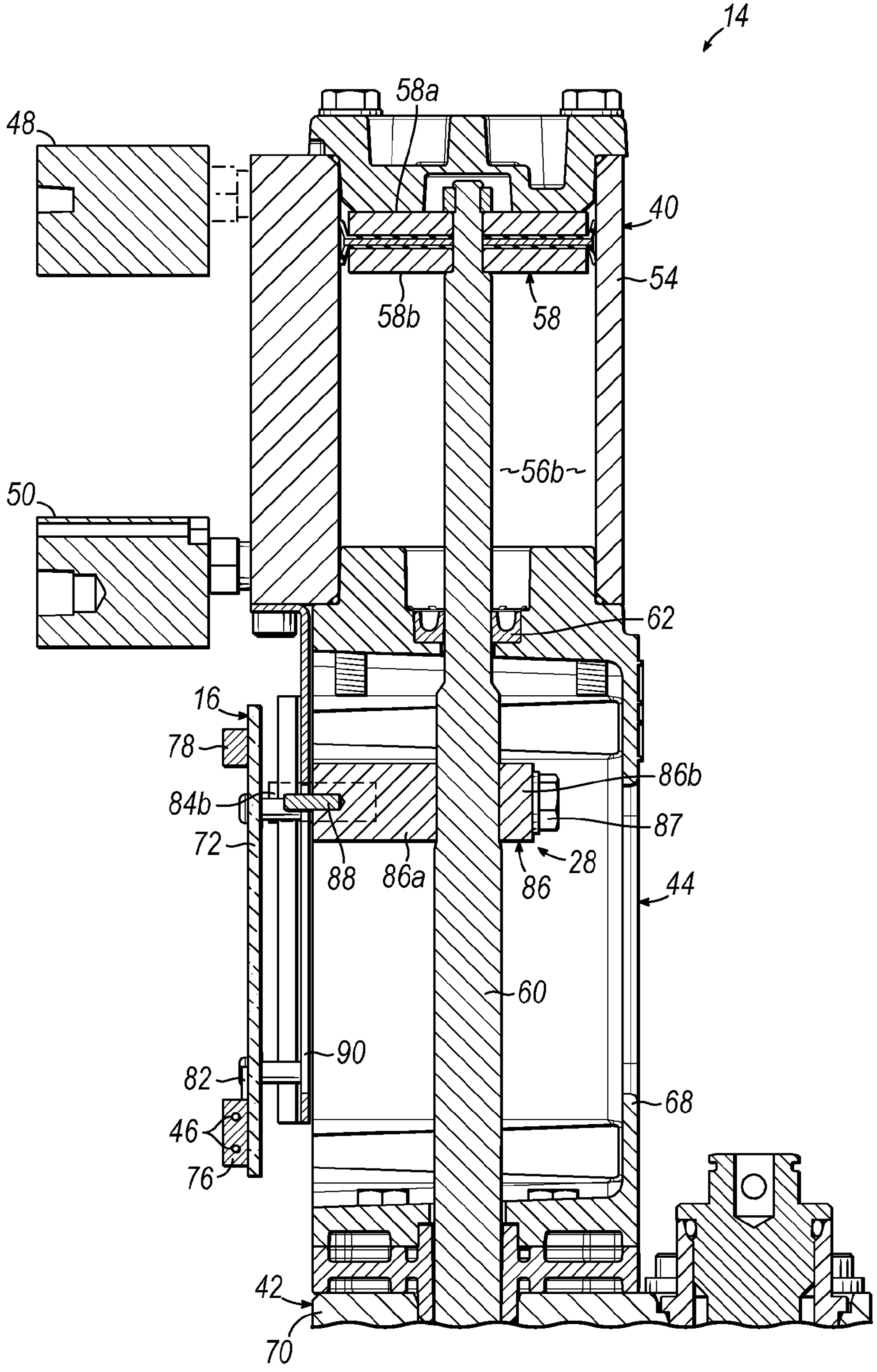
FIG. 6 is a cross-sectional side view of the pump and controller of FIG. 3, showing a piston of the pump in an upper position.
Figure 7:
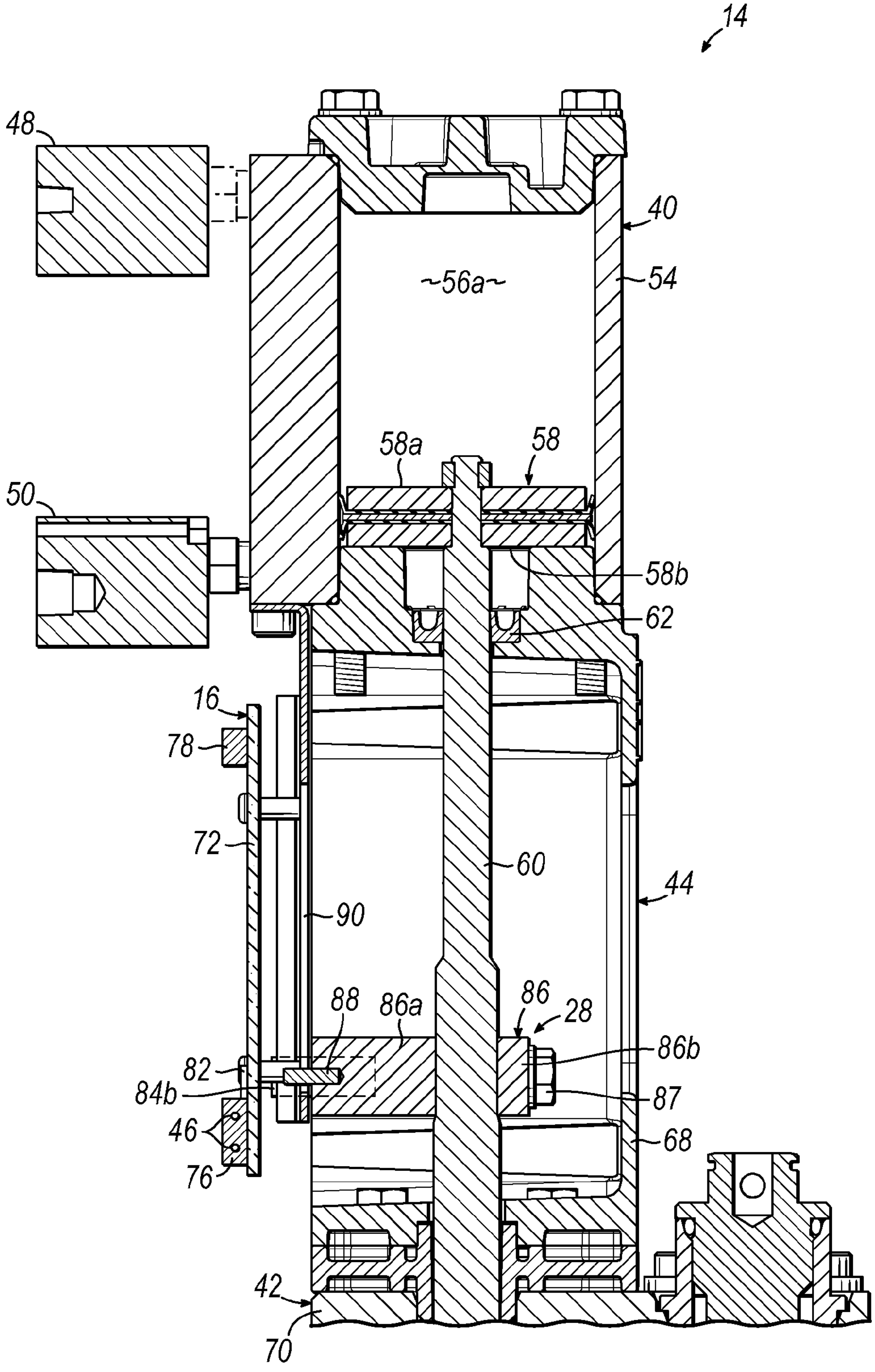
FIG. 7 is a cross-sectional side view of the pump and controller of FIG. 3, showing a piston of the pump in a lower position.

With reference to FIGS. 2 through 7, the piston pump 14 and controller 16 of the first embodiment are illustrated in further detail. The piston pump 14 includes a pneumatic section 40 for operating the pump 14 with pressurized air and a hydraulic section 42 that receives the liquid adhesive from the melter 20 and supplies the liquid adhesive to the dispenser module 12. The pneumatic section 40 and the hydraulic section 42 may be connected by a control section 44 as shown in FIGS. 2 through 4. The control section 44 includes the controller 16 and the shifter 28, each of which is described in further detail below. The controller 16 is connected via control wires 46 (only the ends of which are shown in the FIGS.) to first and second solenoids 48, 50 that are configured to control the flow of pressurized air into the pneumatic section 40 to operate the piston pump 14. Thus, as pressurized air is used at the pneumatic section 40 to operate the pump 14, the hydraulic section 42 causes the liquid adhesive to be pressurized and flow to the dispenser module 12, which is not shown in FIGS. 2 through 7. It will be understood that the first and second solenoids 48, 50 may be replaced by a spool valve or some other similar air control valve without departing from the scope of the invention.

The pneumatic section 40 of the piston pump 14 includes a housing 54 defining a piston chamber 56 that is sealed from the external environment, as shown in FIGS. 3 and 4. The pump 14 includes the piston 58 and the pump rod 60 coupled to the piston 58, as described above, and the piston 58 is located within the piston chamber 56. The pump rod 60 extends downwardly from the piston 58 through a seal 62 in the housing 54 and into the control section 44, and then into the hydraulic section 42. The piston 58 divides the piston chamber 56 into an upper chamber portion **56*a* selectively receiving pressurized air from the first solenoid 48 and a lower chamber portion 56*b* selectively receiving pressurized air from the second solenoid 50. Therefore, the first and second solenoids 48, 50 are alternatively actuated to provide pressurized air in the upper chamber portion 56*a* to push on an upper side 58*a* of the piston 58 to move the piston 58 and pump rod 60 in one direction, and then to provide pressurized air in the lower chamber portion 56*b* to push on a lower side 58*b* of the piston 58 to move the piston 58 and the pump rod 60 in another direction. This reciprocating movement of the pump rod 60 repeatedly draws liquid adhesive into the hydraulic section 42 and expels that liquid adhesive through a pump outlet 66 (FIG. 2) that may lead to the dispenser module 12. In addition, the pump 14** is designed to monitor these movements to enable various diagnostic processes described in further detail below.

With continued reference to FIGS. 3 and 4, the control section 44 includes a hollow housing 68 coupled to the housing 54 of the pneumatic section 40 and also coupled to a hydraulic housing 70 enclosing the hydraulic section 42. The controller 16 includes a circuit board 72 connected to the hollow housing 68. The circuit board 72 may be positioned generally adjacent to the first and second solenoids 48, 50 so that the control wires 46 can be limited in length, thereby reducing the likelihood of tangling or catching the control wires 46 onto non-pump elements in the environment. The circuit board 72 mounts other components of the controller 16 onto the pump 14, including a processor 74 (e.g., a sensing and control circuit enabling device), a memory (not shown), a power supply 76, and a control interface 78. The processor 74 and memory are configured to actuate operation of the pump 14 at the first and second solenoids 48, 50 and collect information related to the operation of the pump 14 that may be used to run at least one diagnostic process as described in further detail below. As shown in FIG. 3, the power supply 76 and the control interface 78 are connected to the first and second solenoids 48, 50 by the control wires 46 such that the first and second solenoids 48, 50 receive actuation signals from the processor 74 and electrical power from the power supply 76. The specific arrangement of components on the circuit board 72 may be modified in other embodiments without departing from the scope of the invention.

The control section 44 also includes the shifter 28, which is an electric shifter 28 in the illustrated embodiment and is best shown in FIG. 4. In this regard, the shifter 28 includes first and second Hall Effect sensors 80, 82 mounted on the circuit board 72 and corresponding first and second magnets **84*a*, 84*b* coupled to the pump rod 60 at the control section 44. The magnets 84*a*, 84*b* are held in position relative to the pump rod 60 by a plate-shaped clamp 86 coupled to the pump rod 60 and shown in further detail in FIGS. 4 and 5. To this end, the plate-shaped clamp 86 includes a first plate portion 86*a* that supports the first and second magnets 84*a*, 84*b* on opposite sides of a guide pin 88 slidably disposed in a guide slot 90 in the hollow housing 68 located adjacent to the circuit board 72. The plate-shaped clamp 86 also includes a second plate portion 86*b* that may be coupled to the first plate portion 86*a* with threaded fasteners 87 to clamp the first and second plate portions 86*a*, 86*b* into rigid and fixed engagement on the pump rod 60. It will be understood that the magnets 84*a*, 84*b*** are shown schematically in FIGS. 4 and 5 and may take any known shape or form. In addition, the magnets 84*a*, 84*b* may be replaced with a single magnet or located in different positions in other embodiments depending on the specific layout of the first and second Hall Effect sensors 80, 82 on the circuit board 72, which may also be modified without departing from the scope of the invention. Furthermore, the magnets may be positioned on different portions of the pump rod 60 or even on the piston 58 in other embodiments consistent with the scope of the invention.

The movement of the guide pin 88 within the guide slot 90 ensures that the magnets 84*a*, 84*b* stay in a known position and orientation proximate to the circuit board 72 during movements of the pump rod 60. The Hall Effect sensors 80, 82 are positioned on the circuit board 72 so that the first magnet 84*a* will approach or pass by the first Hall Effect sensor 80 at the first end condition defined by the upper limit of the stroke of the piston 58 and the pump rod 60, and so that the second magnet 84*b* will approach or pass by the second Hall Effect sensor 82 at the second end condition defined by the lower limit of the stroke of the piston 58 and the pump rod 60. Of course, it will be understood that the Hall Effect sensors 80, 82 may be repositioned in other embodiments such as along the piston chamber 56 to detect movements of the piston 58 in other embodiments. To this end, in such an embodiment, the Hall Effect sensors 80, 82 would alternatively be mounted on the housing 54 of the pneumatic section 40 and a magnet would be positioned on the piston 58 so that movement of the piston 58 could be detected through the housing 54. As a result, the Hall Effect sensors 80, 82 detect when the piston 58 and the pump rod 60 approach the first and second end conditions so that the processor 74 can send a signal to switch the operating state of the solenoids 48, 50 and continue the reciprocating movement of the piston 58 and the pump rod 60. This shifting of the pump 14 is therefore performed without mechanical actuation of magnetic switches, as is the case in so-called mechanical shifters. Moreover, the information collected from the sensed pump movements may be used by the controller 16 to perform the diagnostics described in further detail below.

With reference to FIGS. 4 through 7, the various positions and operating states of the pump 14 are shown in further detail. To this end, FIG. 4 illustrates the piston 58 and the pump rod 60 being located in an intermediate position between the first and second end conditions. In this position, the magnets 84*a*, 84*b* clamped to the pump rod 60 in the control section 44 are not located adjacent to either of the Hall Effect sensors 80, 82. Assuming that the solenoids 48, 50 are in a first operating state in which the second solenoid 50 actively supplies pressurized air to the lower chamber portion 56*b*, the piston 58 and pump rod 60 will move to the first end condition shown in FIG. 6. At this first end condition, the piston 58 is located at the top end of its stroke within the piston chamber 56, and the first magnet 84*a* coupled to the pump rod 60 is located adjacent to the first Hall Effect sensor 80, thereby providing a signal to the controller 16 to switch the operating state of the solenoids 48, 50. The processor 74 sends such a signal via the control interface 78 to the first and second solenoids 48, 50 to switch to a second operating state in which the first solenoid 48 actively supplies pressurized air to the upper chamber portion 56*a*, and the second solenoid 50 is inactive so that pressurized air can be exhausted from the lower chamber portion 56*b*. This second operating state causes the piston 58 and pump rod 60 to move towards the second end condition shown in FIG. 7. At this second end condition, the piston 58 is located at the bottom end of its stroke within the piston chamber 56, and the second magnet 84*b* coupled to the pump rod 60 is located adjacent to the second Hall Effect sensor 82, thereby providing a signal to the controller 16 to switch the operating state of the solenoids 48, 50 back to the first operating state again. The stroke or cycle then repeats as long as the pump 14 is operating to move liquid adhesive to the dispenser module 12. Consequently, the controller 16 of this embodiment has access to the information corresponding to how often the pump 14 moves to the first and second end conditions, as sensed by the first and second Hall Effect sensors 80, 82, and this enables multiple types of diagnostic processes to be performed by the controller 16.

Figure 8:
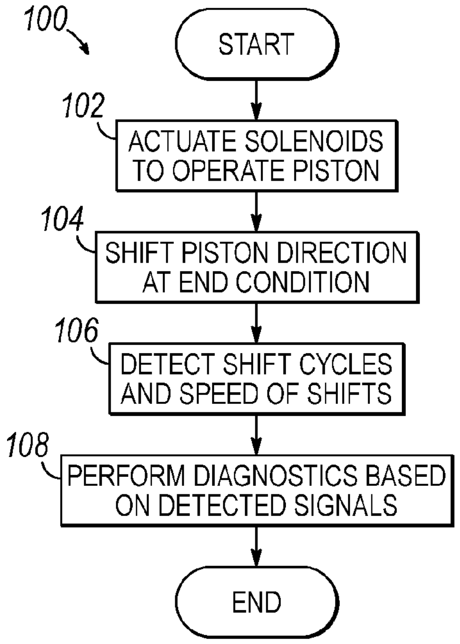
FIG. 8 is a flowchart showing a series of operations performed by the adhesive dispensing system of FIG. 1 to enable various diagnostics.

With reference to FIG. 8, a series of operations 100 performed by the adhesive dispensing system 10 during regular operation is shown in a flowchart. More specifically, the controller 16 actuates the solenoids 48, 50 to operate the piston 58 and the pump rod 60 by moving these components in a reciprocating manner (step 102). As described above, one of the solenoids 48. 50 delivers pressurized air to one side 58*a*, 58*b* of the piston 58 to force movement of the piston 58 within the piston chamber 56. Each time the piston 58 and pump rod 60 reach one of the end conditions, the controller 16 shifts the piston direction by changing the operational state of the solenoids 48, 50 (step 104). The first and second Hall Effect sensors 80, 82 detect movements of the pump (step 106) such that the controller 16 monitors the shift cycles and the speed of the shifts, which are analogous to the number of operational cycles for the pump 14 and the speed of operation for the pump 14. Based on this monitored pump movement, the controller 16 may then perform diagnostic processes to provide current information regarding the pump 14 and how the dispensing system 10 as a whole is operating (step 108). Several of these diagnostic processes are described below, although it will be understood that additional diagnostic processes are enabled by the monitoring of pump movement at the controller 16 (such as, but not limited to, detection of a lack of air pressure being adequately supplied to move the piston 58).

Figure 9:
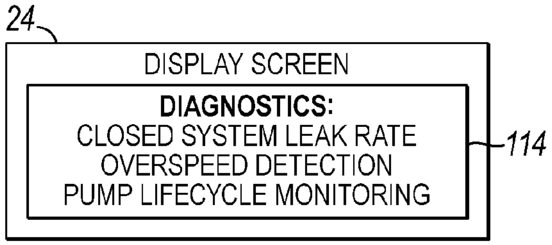
FIG. 9 is a schematic view of a display screen of the adhesive dispensing system of FIG. 1, showing a series of diagnostics that may be performed using the pump and controller.
Figure 10:
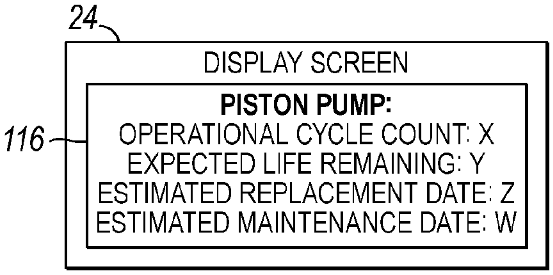
FIG. 10 is a schematic view of the display screen of FIG. 9, showing pump lifecycle monitoring information during one of the diagnostics that may be performed by the pump and controller.

With particular reference to FIGS. 9 and 10, the display screen 24 of the adhesive dispensing system 10 illustrates several pieces of information that may be collected by the dispensing system 10 and several diagnostics that may be run automatically or as desired by the end user. This collected information and all of the diagnostics described in detail below result, at least in part, from the monitoring of pump movements by the first and second Hall Effect sensors 80, 82. Several of the diagnostic processes enabled by the adhesive dispensing system 10 of this embodiment are displayed in a list 114 on the display screen 24 in FIG. 9, each of which is described in detail below. These diagnostic processes include a closed system leak rate test (also known as a "dead head" stroke test), a detection of overspeed at the pump 14, and pump lifecycle monitoring.

A first diagnostic process that may be performed by the controller is a life cycle monitoring diagnostic. As shown by FIG. 10, the number of total operational cycles of the pump 14 can be counted from the monitoring of the appropriate signals from the first and second Hall Effect sensors 80, 82. For example, the number of total operational cycles of the pump 14 will be equivalent to the number of times that the piston 58 and pump rod 60 have traveled through a full stroke, as detected by the number of times the magnets 84*a*, 84*b* are detected by either the first Hall Effect sensor 80 or the second Hall Effect sensor 82. If queried by an operator for the information collected by this life cycle monitoring diagnostic, the display screen 24 may display a list of life parameters 116 as shown in FIG. 10. More particularly, the controller 16 is operative to prompt the display screen 24 to illustrate a total operational cycle count "X" for the pump 14, an expected amount of life remaining "Y" in percent or a number of operational cycles, and an estimated replacement date "Z" for the pump 14, which is estimated based on the usage history of the pump 14. Similar to the replacement date "Z" for the pump 14, the display screen 24 may also illustrate an estimated maintenance date "W" for the pump 14 based on the usage history of the pump 14 in order to inform an operator when the next regularly scheduled maintenance should occur. Thus, instead of only knowing that a pump 14 needs maintenance (e.g., a filter inspection or replacement in one example) or replacement after a fault occurs, these maintenance events can be anticipated and appropriate preparations can be made to limit the impact of the pump 14 coming to the end of the life cycle. For example, the replacement parts for the pump 14 may be automatically ordered and replacement can be scheduled for a convenient time, such as during a regularly scheduled downtime for the dispensing system 10. Accordingly, this diagnostic process minimizes the amount of downtime experienced by an end user that is caused by the pump 14 reaching the end of an expected life cycle.

It will be understood that the controller 16 may be preloaded with a predicted total life cycle for the pump 14, which is an average number of cycles before the pump 14 is likely to fail. This predicted total life cycle is primarily based on historical data for similar batches of components and also based on test data collected by the manufacturer of the components. Several factors may also be programmed in to adjust the predicted total life cycle to fit the particular circumstances in which the pump 14 is placed in operation. In a pump 14, for example, the rate of use, duty cycles, the particular materials dispensed, the operating temperature, and the viscosity of the liquid adhesive being moved all could be known factors that adjust the predicted total life cycle. These factors may be adjusted by the manufacturer or the end user, both before and during use of the component. It will also be understood that in addition or alternatively to the list 116 generated on the display screen 24, the controller 16 may be configured to illuminate one or more of the indicator lights 26 to provide warnings indicating that replacement or repair of the pump 14 is predicted to be necessary soon. Regardless of the method used to provide the indication of remaining life to the end user, the pump 14 advantageously enables such a life cycle monitoring diagnostic based solely on the pump movements that are already sensed for the purpose of shifting the pump 14, at least in embodiments including the electric shifter 28 discussed above.

Another diagnostic process enabled by the adhesive dispensing system 10 is a rough estimation of dispensing flow rate through the dispenser module 12. In this regard, the monitoring of pump movements at the first and second Hall Effect sensors 80, 82 provides an indication of the speed with which the pump 14 is operating. Assuming that the pump 14 moves a set amount of liquid adhesive to the dispenser module 12 for each operational cycle or stroke of the piston 58 and pump rod 60, a rough estimation of a flow rate or a volume provided to the dispenser module 12 can be determined from the speed of operation of the pump 14. This flow rate or volume provided to the dispenser module 12 should be about equivalent to the flow rate or volume output of liquid adhesive being dispensed from the dispenser module 12, so the diagnostic process is capable of providing some information relative to the flow rate of liquid adhesive being dispensed from the dispensing system 10. This information can be compared to the intended flow rates that are supposed to be delivered by the dispenser module 12 to determine if a large inconsistency is present, which may indicate an error condition, such as a high rate of leakage in the adhesive dispensing system 10.

The adhesive dispensing system 10 may also enable another diagnostic process to test for an overspeed condition at the pump 14. Overspeed is defined as operating the pump 14 with a cycle speed or stroke speed that exceeds a predetermined threshold that the components of the pump 14 are designed to withstand. The overspeed condition may be caused by a number of error states or fault conditions, including running out of adhesive at the hydraulic section 42, a burst hose causing no pressure at the pump 14, or a problem with the PDV 30. In each of these circumstances, the pump 14 is unencumbered by the flow of liquid adhesive and therefore tends to operate faster and faster until the pump 14 reaches overspeed. The overspeed condition can rapidly and significantly damage multiple components of the pump 14, including the piston 58 and the pump rod 60.

The diagnostic process that tests for the overspeed condition simply monitors the speed of operational cycles of the pump 14 during all times when the pump 14 is operating and continuously checks the current pump speed against the predetermined threshold. If the controller 16 determines that the current speed of the pump 14 exceeds the predetermined threshold, the controller 16 may generate an indication to the operator that an overspeed condition is occurring, and may also modify the actuation of the solenoids 48, 50 to slow down or completely stop the pump movements, thereby eliminating the overspeed condition. Moreover, this responsive reduction of speed at the pump 14 prevents the pump 14 from staying in the overspeed condition for more than a couple operational cycles, which thereby reduces the likelihood of damage to pump components by a significant amount. The indication of the overspeed condition can be provided to the end user, such as by a message at the display screen 24 or the illumination of one or more indicator lights 26, and the end user can check various items to determine why the pump 14 lost hydraulic pressure. The indication may be provided locally at the pump 14 itself or transmitted via a programmable logic controller or other devices to remote monitoring locations with an operator. In this regard, the pump 14 can be stopped so that the end user can determine if the PDV 30 is not operational or if a hose has burst in the adhesive dispensing system 10, for example. Advantageously, this test for overspeed may be performed without adding additional equipment to the pump 14 of the exemplary embodiment. More particularly, the test for overspeed is accomplished without the use of expensive pressure transducers in the hydraulic section 42 of the pump 14.

Figure 11:
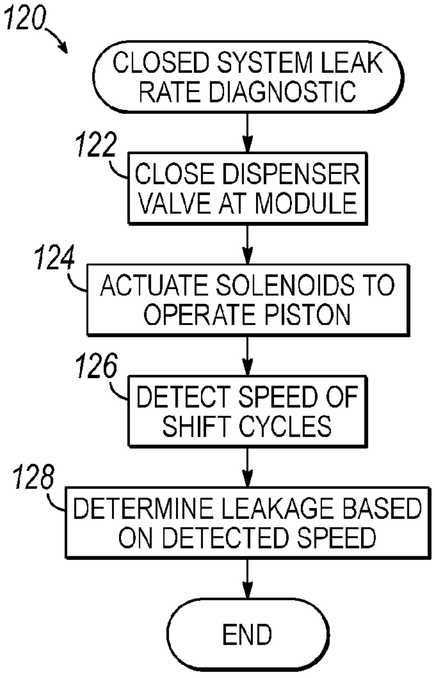
FIG. 11 is a flowchart showing a series of operations performed by the adhesive dispensing system of FIG. 1 during a closed system leak rate diagnostic.

With reference to FIG. 11, another diagnostic process enabled by the adhesive dispensing system 10 of this embodiment is a leak rate test (also referred to as a dead-head stroke test) defined by a series of operations 120 shown in a flowchart. To this end, the leak rate test begins by closing any dispenser valves at the dispenser module 12 (step 122). This closing of the dispenser valve stops the dispensing operation in the adhesive dispensing system 10. It will be appreciated that in embodiments of the adhesive dispensing system 10 without the dispenser module(s) 12, another valve located downstream from the pump outlet 66 could be closed to prevent flow from the pump 14 to be removed from the adhesive dispensing system 10. Hypothetically, the pump 14 should then be unable to move any liquid adhesive to the closed dispenser module 12 if no leaks are present in the adhesive dispensing system 10. The leak rate test continues by actuating the solenoids 48, 50 with the controller 16 to try and operate the pump 14 (step 124). The controller 16 can then monitor the speed of operational cycles at the pump 14 based on how often the first and second Hall Effect sensors

80, 82 detect movements of the pump 14 to the corresponding end conditions (step 126). The amount of leakage in the adhesive dispensing system 10 can be determined based on the speed of operational cycles achieved by the pump 14 during this test. As alluded to above, a higher speed achieved by the pump 14 indicates a higher amount of leakage from the adhesive dispensing system 10. If this leakage exceeds certain thresholds, the controller 16 may determine that the leakage is too high and then provide an indication of the identified error state or fault condition to the end user. This leak rate test may be run periodically, such as at the beginning of each working day for the adhesive dispensing system 10. Therefore, leakage problems that slowly develop over time can be detected early as a trend and addressed if necessary, thereby limiting the variance or undesired reduction of pressure and volume of adhesive delivered per stroke of the pump 14 as a result of leaks.

As described generally in the previous two diagnostic processes (overspeed detection test and leak rate test), the diagnostic processes can be used to identify any of a number of error states or fault conditions that may be determined, at least in part, on the basis of how quickly the pump 14 is moving through operational cycles or strokes. The indicator lights 26 or display screen 24 may be illuminated to provide an indication to the end user whenever one of these error states or fault conditions is identified, and corrective action may also be taken automatically in certain circumstances, like when the overspeed condition is detected. These diagnostic processes therefore increase the amount of information available to an end user and decrease the amount of unplanned downtime caused by unexpected failures of the pump 14 or other components of the adhesive dispensing system 10. In this regard, any maintenance and replacement can be planned out in advance of regularly-scheduled downtimes for the adhesive dispensing system 10, and replacement parts or components can be delivered in advance of the need. Moreover, the diagnostic processes can be performed using information already sensed by the Hall Effect sensors 80, 82, when an electric shifter 28 is used with the controller 16 as described in the exemplary embodiment. In this regard, no additional equipment or sensors, such as pressure transducers in the hydraulic section 42, are required to obtain the relevant information about the pump 14 and the adhesive dispensing system 10. Consequently, the adhesive dispensing system 10 and methods of the current invention provide significant amounts of information via integrated diagnostic processes that do not require additional equipment or components. More specifically, the pump 14 is controlled and provides information for diagnostics with added simplicity in manufacturing and added economy by not requiring additional components to perform the diagnostics.

The adhesive dispensing system 10 may be modified in other embodiments without departing from the scope of the invention. As mentioned above, one modification in some embodiments is to use a different type of pump, such as a gear pump. In those embodiments, a different type of operational cycle sensing may be required, but the diagnostic processes operate in much the same fashion regardless of how the operational cycles of a pump are detected. In other embodiments, the sensors 80, 82 could be added to a pump that uses a mechanical shifter rather than the electric shifter 28 of the previously described embodiment. As well understood, the mechanical shifter still requires a magnet to be carried along the stroke length by the pump rod 60, and this magnet could still be detected by the sensors 80, 82 if they are added to the housing of those systems. Therefore, the methods of operating an adhesive dispensing system 10 to collect information regarding operational cycles of the pump 14 and to perform diagnostic processes based on sensed pump movements are still possible regardless of the type of pump 14 or shifter 28 used with the adhesive dispensing system 10.

Figure 12:
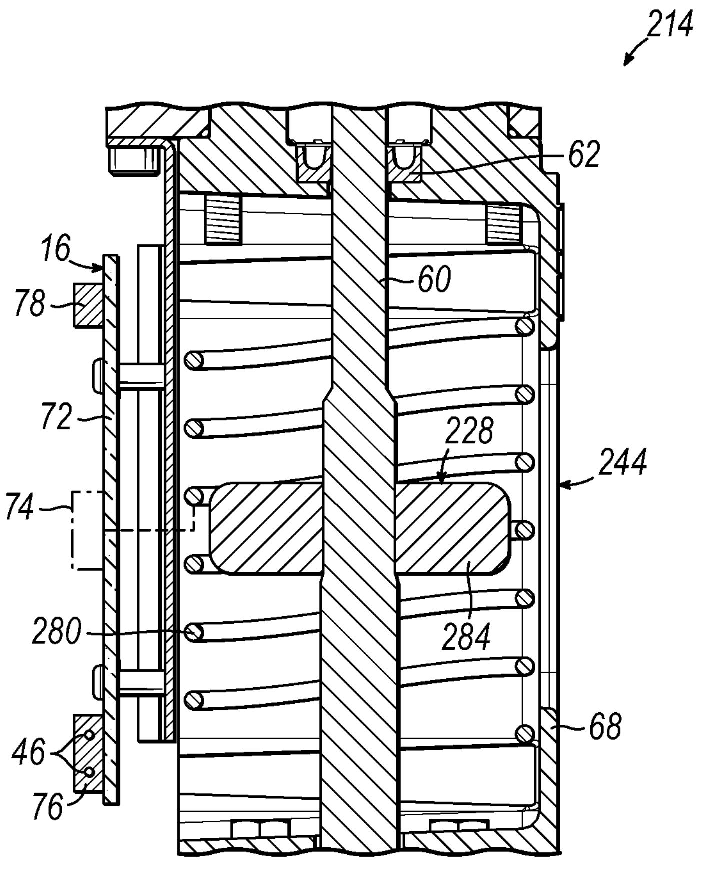
FIG. 12 is a side view of a pump and controller according to another embodiment of the adhesive dispensing system.

With reference to FIG. 12, another embodiment of a pump 214 that may be used in the adhesive dispensing system 10 of the current invention is shown. This pump 214 includes much of the same structure as the pump 14 of the first embodiment, and identical elements have been omitted from the drawing or labeled with the same reference numbers in this Figure (including the pump rod 60, the processor 74, the power supply 76, the control interface 78, and the circuit board 72). The pump 214 of this embodiment has been modified to include a different type of electric shifter 228. More specifically, the electric shifter 228 of this embodiment includes a linear variable differential transformer (LVDT) sensor 280 that extends as a coil along a length of the hollow housing 68. The LVDT sensor 280 is operatively coupled with the processor 74 as shown in phantom in FIG. 12. The pump rod 60 in this embodiment carries a different style of magnetic piece 284 at the control section 244, although it will be understood that this piece 284 could be a magnetic piston or some other known structure for generating detectable signals at the LVDT sensor coil 280. Therefore, similar to the previous embodiment, the LVDT sensor 280 detects movements of the pump 214 and provides those sensed movements to the controller 16 for collection or use in diagnostic processes. The LVDT sensor 280 is different in that it may detect exactly where the magnetic piece 284 and the pump rod 60 are located along the intermediate space between the first and second end conditions at all times during operation, so the output from the LVDT sensor 280 may enable finer control of shifting the solenoids 48, 50 and finer levels of measurement used during the diagnostic processes (e.g., lower leak rates would be determined by the smaller amounts of movement detectable by this embodiment of the adhesive dispensing system 10).

It will be appreciated that the LVDT sensor 280 may be incorporated at different locations relative to the pump rod 60 in other embodiments, such as above the piston chamber 56 when the pump rod 60 is extended to project outside and above the piston chamber 56. It will also be understood that other types of sensors beyond those disclosed in these embodiments may be used with the adhesive dispensing system 10 without departing from the invention. For example, the sensor may include other alternative types of sensors, including but not limited to: capacitive sensors, contact sensors such as those with microswitches, and intermediate sensors such as a rack-like element that provides indications of partial stroke movements of the pump rod. In this regard, the sensor may include any kind of point sensor that detects when the piston and pump rod reach a certain location during movement, or any type of proximity sensor, position sensor, or linear continuous/incremental movement sensor that detects movement over a range of the piston and pump rod movement.

In yet another alternative embodiment of an adhesive dispensing system according to the invention, the diagnostic processes described above may be performed by a separate diagnostic device having a controller that receives signals from the one of the sensors described above. For example, the schematic system shown in FIG. 1 may be modified by adding a separate controller of the diagnostic device, which is connected to the display screen 24 and status LEDs 26 instead of the pump controller 16. However, even when the controller operating the diagnostic processes is independent from the controllers of the adhesive dispensing device 10, the collection of information and the performance of the diagnostic processes remain the same as described in detail above. Therefore, the description provided above suffices to explain the operation of this alternative embodiment.

While the present invention has been illustrated by a description of several embodiments, and while those embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. A method of operating an adhesive dispensing system including a dispenser device and a pump having a pump rod, the method comprising:

arranging a control section of the pump to extend between and be coupled to each of a hydraulic section and an actuator section, wherein the hydraulic section receives a liquid adhesive and selectively supplies the liquid adhesive to the dispenser device based on operations of the pump rod, wherein the actuator section includes an actuator operatively coupled to the pump rod and configured to move the pump rod between first and second end conditions, and such that the pump rod extends through the control section from the actuator section to the hydraulic section;

operating the pump by moving the pump rod to move liquid adhesive from a source of liquid adhesive through the hydraulic section to a pump outlet communicating with the dispenser device;

monitoring movements of the pump rod with a shifter located at the control section and including at least one sensor positioned to sense movements of the pump rod to each of the first and second end conditions;

producing signals with the at least one sensor based on the monitored movements of the pump rod;

collecting information with a controller located at the control section regarding operational cycles of the pump based on the produced signals;

sending signals to the actuator with a processor of the controller located at the control section, to switch movement direction of the pump rod when the shifter detects pump rod movement to one of the first and second end conditions based on the collected information; and performing at least one diagnostic process with the processor, the at least one diagnostic process pertaining to the pump or to the adhesive dispensing system based on the collected information, thereby providing actuator control and diagnostic functionality directly at the location of the pump.

2. The method of claim 1, wherein performing at least one diagnostic process further comprises:

monitoring a total number of operational cycles performed by the pump based on the collected information; and providing an indication that the pump will require maintenance or replacement after the pump has reached the total number of operational cycles corresponding to a predetermined percentage of predicted total life cycle.

3. The method of claim 1, wherein performing at least one diagnostic process further comprises:

monitoring a speed of operational cycles performed by the pump based on the collected information; and determining an approximate flow rate or total volume of liquid adhesive being dispensed by the adhesive dispensing system based on a speed of the operational cycles performed by the pump.

4. The method of claim 1, wherein performing at least one diagnostic process further comprises:

monitoring a speed of operational cycles performed by the pump based on the collected information;

determining if the speed of operational cycles exceeds a predetermined threshold indicating an overspeed condition; and providing an indication to an operator regarding occurrence of the overspeed condition.

5. The method of claim 4, wherein performing at least one diagnostic further comprises:

slowing down the movements of the pump in response to the determination of an overspeed condition at the pump.

6. A method of operating an adhesive dispensing system including a pump, the method comprising:

operating the pump by moving a pump component to move liquid adhesive from a source of liquid adhesive to a pump outlet;

monitoring movements of the pump component with at least one sensor;

producing signals with the at least one sensor based on the monitored movements of the pump component;

collecting information with a controller regarding operational cycles of the pump based on the signals; and performing at least one diagnostic process with the controller, the at least one diagnostic process pertaining to the pump or to the adhesive dispensing system as a whole based on the collected information, wherein performing at least one diagnostic process includes a leak rate test comprising:

closing a valve downstream from the pump outlet to stop flow of liquid adhesive out of the adhesive dispensing system;

continuing to operate the pump to attempt to move liquid adhesive from a source of liquid adhesive to the pump outlet;

measuring a speed of operational cycles performed by the pump based on the collected information after closing the dispenser valves; and providing an indication of an approximate leak rate in the adhesive dispensing system based on the measured speed of operational cycles performed by the pump with the valve downstream from the pump outlet closed.

7. The method of claim 6, wherein the adhesive dispensing system includes a dispenser device including a dispenser valve operating to dispense liquid adhesive delivered through the pump outlet, and closing the valve downstream from the pump outlet further comprises:

closing the dispenser valve at the dispenser device to stop dispensing liquid adhesive and to stop flow of liquid adhesive out of the adhesive dispensing system.

8. The method of claim 1, further comprising:

generating a message on a display screen or illuminating at least one indicator light based on the at least one diagnostic process.

9. The method of claim 1, wherein the at least one diagnostic process is performed without measurements of pressure in the pump by a pressure transducer.

10. The method of claim 1, wherein the pump is a piston pump including a piston coupled to the pump rod, and operating the pump further comprises:

actuating at least one solenoid with the controller to supply pressurized air to one side of the piston, thereby moving the piston and the pump rod from the first end condition to the second end condition;

switching an operating state of the at least one solenoid;

actuating the at least one solenoid with the controller to supply pressurized air to the other side of the piston, thereby moving the piston and the pump rod from the second end condition to the first end condition; and moving liquid adhesive with the pump rod during the movement of the pump rod between the first and second end conditions.

11. The method of claim 10, wherein monitoring movements of the pump rod further comprises:

detecting when the piston and the pump rod approach the first and second end conditions with the at least one sensor.

12. The method of claim 11, wherein the at least one sensor includes first and second Hall Effect sensors, at least one magnet is positioned on at least one of the piston and the pump rod, and the detecting step further comprises:

detecting when the piston and the pump rod approach the first end condition by sensing at least one of the magnets moving past the first Hall Effect sensor; and detecting when the piston and the pump rod approach the second end condition by sensing at least one of the magnets moving past the second Hall Effect sensor.

13. The method of claim 12, wherein switching the operating state of the at least one solenoid further comprises:

switching an operating state of the at least one solenoid each time the first or second Hall Effect sensor detects when the piston and the pump rod approach the first or second end condition.

14. The method of claim 10, wherein monitoring movements of the pump rod further comprises:

detecting when the piston and the pump rod approach the first and second end conditions with the at least one sensor; and detecting when the piston and the pump rod are located at an intermediate location between the first and second end conditions with the at least one sensor.

15. The method of claim 14, wherein the at least one sensor includes an LVDT sensor, a magnetic piece is positioned on at least one of the piston and the pump rod to move along the LVDT sensor, and the detecting steps further comprise:

detecting the current location of the piston and the pump rod by sensing the location of the magnetic piece moving along the LVDT sensor.

16. An adhesive dispensing system, comprising:

a dispenser device for dispensing liquid adhesive;

a pump coupled to the dispenser device and including a pump rod that moves to move the liquid adhesive from a source of liquid adhesive to the dispenser device, the pump further comprising:

a hydraulic section that receives the liquid adhesive and selectively supplies the liquid adhesive to the dispenser device based on operations of the pump rod, which extends into the hydraulic section;

an actuator section including an actuator operatively coupled to the pump rod and configured to move the pump rod between first and second end conditions;

a control section extending between and coupled to each of the hydraulic section and the actuator section such that the pump rod extends through the control section from the actuator section to the hydraulic section;

a shifter located at the control section and including at least one sensor positioned to sense movements of the pump rod to each of the first and second end conditions and produce signals based on the sensed movements; and a controller located at the control section and operating the pump, the controller communicating with the at least one sensor to collect information regarding operational cycles of the pump based on the signals, the controller including a processor at the control section that (a) sends signals to the actuator to switch movement direction of the pump rod when the shifter detects pump rod movement to one of the first and second end conditions based on the collected information and also (b) performs at least one diagnostic process pertaining to the pump and the adhesive dispensing system based on the collected information, thereby providing actuator control and diagnostic functionality directly at the location of the pump.

17. The adhesive dispensing system of claim 16, wherein the at least one diagnostic process includes one of the following:

a life cycle monitoring process in which the total number of operational cycles performed by the pump is monitored and an indication of when maintenance will be required is generated based on when the total number of operational cycles exceeds a threshold;

a flow rate approximation process in which the flow rate or total volume of liquid adhesive being delivered by the pump is estimated based on the signals;

an overspeed detection process in which the pump is slowed or shut down when an overspeed condition occurs; and a leak rate test process in which the pump is operated while the dispenser device is closed to determine a leak rate from the speed of the pump.

18. The adhesive dispensing system of claim 16, further comprising:

at least one indicator light or a display screen operatively coupled to the controller such that the controller illuminates the indicator light or a message on the display screen based on the at least one diagnostic process.

19. The adhesive dispensing system of claim 16, wherein the pump is a piston pump and the actuator further comprises:

a piston chamber;

a piston connected to the pump rod and positioned for movement within the piston chamber; and at least one solenoid configured to supply pressurized air into the piston chamber to move the piston and the pump rod between the first and second end conditions.

20. The adhesive dispensing system of claim 19, wherein the at least one sensor includes first and second Hall Effect sensors, and at least one of the piston and the pump rod includes at least one magnet positioned to move past the first and second Hall Effect sensors when the piston and pump rod approach the first and second end conditions, respectively.

21. The adhesive dispensing system of claim 19, wherein the at least one sensor includes an LVDT sensor, and at least one of the piston and the pump rod includes a magnetic piece positioned to move along the LVDT sensor such that the LVDT sensor can detect the current position of the piston and the pump rod relative to the first and second end conditions.

22. A pump configured for use in an adhesive dispensing system, the pump comprising:

a pump rod that moves in a repeatable manner between first and second end conditions and is configured to actuate movement of liquid adhesive from a source of liquid adhesive to a dispenser device within the adhesive dispensing system;

a hydraulic section that receives the liquid adhesive and selectively supplies the liquid adhesive to the dispenser device based on operations of the pump rod, which extends into the hydraulic section;

an actuator section including an actuator operatively coupled to the pump rod and configured to move the pump rod between the first and second end conditions;

a control section extending between and coupled to each of the hydraulic section and the actuator section such that the pump rod extends through the control section from the actuator section to the hydraulic section;

a shifter located at the control section and including at least one sensor positioned to sense movements of the pump rod to each of the first and second end conditions and produce signals based on the sensed movements; and a controller located at the control section and operating the pump, the controller communicating with the at least one sensor to collect information regarding operational cycles of the pump based on the signals, the controller including a processor at the control section that (a) sends signals to the actuator to switch movement direction of the pump rod when the shifter detects pump rod movement to one of the first and second end conditions based on the collected information and also (b) performs at least one diagnostic process pertaining to the pump and the adhesive dispensing system based on the collected information, thereby providing actuator control and diagnostic functionality directly at the location of the pump.

23. The pump of claim 22, wherein the at least one diagnostic process includes one of the following:

a life cycle monitoring process in which the total number of operational cycles performed by the pump is monitored and an indication of when maintenance will be required is generated based on when the total number of operational cycles exceeds a threshold;

a flow rate approximation process in which the flow rate or total volume of liquid adhesive being delivered by the pump is estimated based on the signals;

an overspeed detection process in which the pump is slowed or shut down when an overspeed condition occurs; and a leak rate test process in which the pump is operated while a valve controlling flow downstream from the pump is closed to determine a leak rate from the speed of the pump.

24. The pump of claim 22, wherein the actuator further comprises:

a piston chamber;

a piston connected to the pump rod and positioned for movement within the piston chamber; and at least one solenoid configured to supply pressurized air into the piston chamber to move the piston and the pump rod between the first and second end conditions.

25. The pump of claim 24, wherein the at least one sensor includes first and second Hall Effect sensors, and at least one of the piston and the pump rod includes at least one magnet positioned to move past the first and second Hall Effect sensors when the piston and pump rod approach the first and second end conditions, respectively.

26. The pump of claim 24, wherein the at least one sensor includes an LVDT sensor, and at least one of the piston and the pump rod includes a magnetic piece positioned to move along the LVDT sensor such that the LVDT sensor can detect the current position of the piston and the pump rod relative to the first and second end conditions.

* * * * *